United States Patent [19]

Nausedas

[11] Patent Number: 4,551,370
[45] Date of Patent: Nov. 5, 1985

[54] SHIRRED CASING STICK ARTICLE WITH END CLOSURE AND METHOD FOR MAKING THE SAME

[75] Inventor: Joseph A. Nausedas, Oak Forest, Ill.

[73] Assignee: Union Carbide Corporation, Danbury, Conn.

[21] Appl. No.: 481,032

[22] Filed: Mar. 31, 1983

[51] Int. Cl.$^4$ ............................................. A22C 13/00
[52] U.S. Cl. ................................... 428/36; 426/105; 138/118.1; 17/49
[58] Field of Search ............... 426/135, 138, 140, 105; 17/49, 41, 42, 1 R; 428/36; 138/118.1

[56] References Cited

U.S. PATENT DOCUMENTS

| | | | |
|---|---|---|---|
| 3,383,222 | 5/1968 | Alsys et al. | 428/36 |
| 3,892,869 | 7/1975 | Sheridan et al. | 426/138 |
| 4,411,048 | 10/1983 | Green | 17/49 |

Primary Examiner—John E. Kittle
Assistant Examiner—James J. Seidleck
Attorney, Agent, or Firm—Dale L. Carlson

[57] ABSTRACT

A shirred stick casing article with a symmetrically invaginated and axially compressed closure forming a plug of casing material implanted in either an end of the casing stick or in a support tube within the casing stick. An apparatus and method are described for making the inventive article.

4 Claims, 17 Drawing Figures

SHIRRED CASING STICK ARTICLE WITH END CLOSURE AND METHOD FOR MAKING THE SAME

FIELD OF THE INVENTION

The present invention relates to a shirred casing stick article including an end closure of casing material, and to methods and apparatus for making such an article. More particularly, the invention relates to a casing article with an implanted and axially compressed closure forming a plug of casing material in either an end of the casing stick or in a support tube within the casing stick.

BACKGROUND OF THE INVENTION

Shirred food casings of flexible tubing are commonly used in the food industry for making and processing various encased food products such as frankfurters, sausages, or the like. Consequently, shirred casings, the methods of making the casing materials, casing shirring methods, shirred tubular casing articles or "sticks", and the apparatus and methods relating to the use of the shirred casing to produce a stuffed food product, are all well known in the art. For example, a shirred casing, a shirring method and apparatus are described generally in U.S. Pat. No. 2,984,574. U.S. Pat. No. 3,115,668 describes a machine for stuffing a shirred casing stick to make linked sausages or frankfurters. Recently, "large size" casing sticks have been mounted on support tubes for the purpose of providing a coherent stick that can be compressed to provide increased casing length for a given stick length, as described in U.S. application Ser. No. 363,851.

The advent of automatic machines for the stuffing and/or linking of shirred food casings as described, for example, in Townsend U.S. Pat. No. 3,115,668, has greatly increased the production rate of sausage type products. In an automated stuffing operation, as described in the Townsend Patent, hollow shirred casing sticks are fed automatically and rapidly onto the stuffing horn of the stuffing machine. The horn axially picks up the stick by extending through the bore of the hollow stick to the fore end of the stick. The horn then advances the stick into a chuck. The chuck grips the fore end of the stick and rotates the stick about the horn during the stuffing operation to link the stuffed casing.

In order for the horn to advance the stick into the chuck, the bore of the stick at the fore end must be plugged. With the bore plugged in this fashion, the stuffing horn can push on the plug from inside the stick until the fore end is firmly gripped by the chuck. The stuffing horn continues to advance into the chuck, and this moves the plug out of the bore of the shirred stick and deshirrs a portion of the casing from either the fore end of the stick or from the plug at the start of the stuffing cycle.

Another function of the plug is that it seals the casing end to block flow of the emulsion being stuffed in the initial stage of the stuffing operation and prior to the formation of the first link. In this respect, emulsion forces the casing of the plug into the linker so that flow of the emulsion out of the casing is restricted until the first link is formed, yet the emulsion is easily strippable in a subsequent operation as described hereinbelow.

Providing a casing stick having a plug or closure formed at one end, generally, can be more uniformly and economically accomplished during the manufacturing of the shirred casing stick than during use of the casing. To this end, various types of casing closures and methods for forming such closures are known in the art. For example, Townsend, U.S. Pat. No. 3,162,893, discloses a casing end closer which engages the terminal end pleats of the shirred casing and rotates to twist the casing tightly upon itself to form, as Townsend describes, a closure "having a knot-like neck". Other end closures are formed by pinching and twisting end pleats of the casing as in U.S. Pat. No. 3,882,252 and Canadian Patent No. 813,838. End closures can also be formed within the hollow stick or formed outside the stick and subsequently inturned or implanted within the stick. For example, Alsys, U.S. Pat. No. 3,274,005 discloses a shirred casing having an end which is twisted closed outside the hollow stick and then pulled into a position within the bore of the shirred casing. A second Alsys U.S. Pat. No. 3,383,222 discloses a shirred casing having a compressed plug end closure implanted in the fore end of the stick. Here the plug is formed by pulling a strand of the casing laterally across the bore of the stick to form a blind, inturning the strand into the end of the casing stick, and then forming the inturned strand into a plug by axially compressing the inturned strand against a fixed surface with a plunger inserted into the other end of the casing stick. Because the formation of the blind in this patent involves the assymetrical stretching of unshirred casing across the bore of the stick, the resulting plug is assymetrical relative to the axis of the stick bore.

In Tums, U.S. Pat. Nos. 3,865,954, 3,914,447 and 4,070,729 there are disclosed, respectively, a hollow casing stick having an end closure, a method, and a device for forming the end closure, wherein the closure is a progressively twisted, close packed knot implanted within the bore of the shirred stick. The Tums closure is formed by twisting terminal pleats of the shirred stick about a rod inserted within the bore of the shirred stick. Sheridan et al., U.S. Pat. No. 3,892,869, discloses a floating end closure formed within the shirred stick from a predetermined amount of casing material that has been inturned into the bore of the shirred stick and axially compressed. The resulting closure is assymetrical relative to the stick bore.

In U.S. Pat. No. 4,075,938, the end closure is formed within the casing stick by first winding a deshirred portion of the casing to form a wall portion across the bore of the stick. The winding mechanism, including a rotating mandrel, is then advanced into the bore of the casing stick. This advances the wall portion into the bore while simultaneously winding deshirred casing on the rotation mandrel to form a generally cylindrically twisted or radially wound portion following the advancing wall portion.

A further, twisted, implanted closure is disclosed in German patent application Ser. No. P 29 26543.8 published on Jan. 22, 1981. Here the winding mechanism is moved axially away from the end of the stick as it is rotated so that the casing material can be twisted between 20 and 30 revolutions without tearing the casing material. The twist closure of casing material formed by these rotations is then pushed axially to move it into the bore of the stick.

Other end closures formed within the shirred stick by crimping an end of the stick are shown in Matecki, U.S. Pat. Nos. 3,419,401; 3,550,191; 3,564,647; and 3,570,045. End closures formed outside the bore of the stick and subsequently implanted are shown in U.S. Pat. Nos. 3,942,568; 3,942,569; and 3,971,301.

Heretofore, there has been no end closure disclosed in the art made from symmetrically invaginated, axially compressed and implanted casing material. In addition, no end closure has been disclosed in the art for use with a shirred casing stick mounted on a support tube. In view of the commercial importance of such casing sticks, a symmetrical end closure and a method of producing such end closure is highly desirable.

OBJECT OF THE INVENTION

It is an object of the present invention to provide a shirred stick casing article having a symmetrical end closure formed by symmetrically invaginating and axially compressing unshirred casing material located in either an end of the shirred stick or in a support tube within the casing stick.

Other objects include providing a method and apparatus for producing the above casing article.

These and other objects will become apparent from a reading of the following detailed specification.

SUMMARY OF THE INVENION

The present invention relates, in one aspect, to a hollow tubular shirred casing stick article having an open end and a closed end, the closed end including a symmetrical plug of axially compressed casing material, the casing material having at least one portion symmetrically invaginated and implanted inside the bore of the stick at the closed end. In an alternate embodiment the shirred stick can be mounted on a support tube. In this instance, the plug can be located inside the support tube. The plug can be vented or nonvented.

In another aspect, the invention relates to a method of forming a symmetrical end closure for a hollow, shirred food casing stick comprising the steps of:

(a) providing a shirred casing stick having a stick bore and an unshirred portion of casing at a closable end of the stick;

(b) symmetrically invaginating at least some length of the unshirred portion to provide a symmetrically implanted portion of casing;

(c) placing a fixed surface adjacent the closeable end of the stick;

(d) axially compressing the implanted portion against the fixed surface to provide a symmetrical, implanted and axially compressed end closure for the stick.

In still another aspect, the invention relates to a method of forming a symmetrical end closure for a hollow, shirred food casing stick comprising the steps of:

(a) providing a shirred casing stick having a stick bore and an unshirred portion of casing at a closable end of the stick;

(b) inserting into the unshirred portion, by way of either end of the stick, a rod cooperable with engagement means to provide engagement of the unshirred portion with the rod;

(c) introducing engagement means to provide engagement of at least a part of the unshirred portion of casing with the rod;

(d) symmetrically invaginating at least some length of the unshirred portion to provide a symmetrically implanted portion of casing by moving the rod into the bore of the stick for said length;

(e) placing a fixed surface adjacent the closeable end of the stick;

(f) axially compressing the implanted portion against the fixed surface to provide a symmetrical, implanted and axially compressed end closure for the stick.

In an alternate embodiment, an unvented, symmetrical, implanted and axially compressed end closure is produced by the above method with the additional step of removing the rod from the shirred stick after step (d) above.

In yet another aspect, the present invention encompasses an apparatus for forming a symmetrical end closure in a shirred casing stick having an internal bore and an unshirred length of casing comprising, in combination;

(a) a rod supported in line with the bore of the shirred casing;

(b) control means for inserting the rod into the unshirred length of casing from an end of the shirred casing and for retracting and removing the rod from the casing to invaginate the unshirred length; and (c) engagement means to provide engagement of at least a part of the unshirred portion of casing with the rod at designated positions of the rod and thereby to allow the rod to invaginate the unshirred length within the bore of the stick;

(d) ram means and stop means for compressing the unshirred length of casing into a symmetrical implanted end closure after invaginating the unshirred length within the bore.

BRIEF DESCRIPTION OF THE DRAWINGS

FIGS. 15 to 18 show alternate means of performing a step in the method of the present invention.

DETAILED DESCRIPTION OF THE INVENTION

Figure 1:
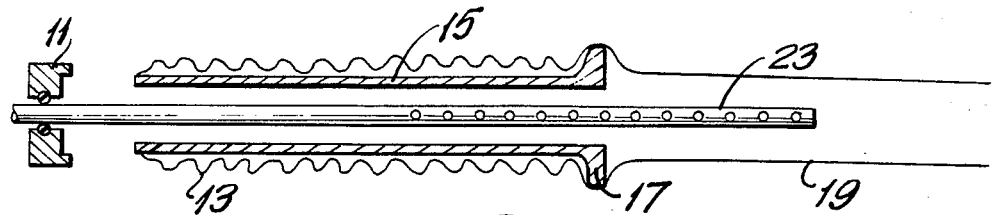
FIGS. 1 to 6 show, schematically and step-by-step, the method of forming a casing stick article with closure in accordance with the present invention.

In a preferred aspect, the invention relates to a method of forming a symmetrical end closure for a hollow, shirred food casing stick comprising the steps of:

(a) providing a shirred casing stick having a stick bore and an unshirred portion of casing at a closable end of the stick;

(b) inserting into the unshirred portion, by way of either end of the stick, a hollow rod having at least one hole, the hole forming a passageway from an inside surface to an outside surface of the hollow rod, the hollow rod being in communication with vacuum means to provide a vacuum in the unshirred portion;

(c) providing a first seal between the unshirred portion and the hollow rod at an open end of the unshirred casing using sealing means;

(d) providing a second seal between an open end of the shirred stick and the hollow rod;

(e) evacuating at least a part of the unshirred portion through the hole using the vacuum means in cooperation with the hollow rod to provide an evacuated and collapsed piece of the unshirred portion of casing engaged upon the hollow rod;

(f) symmetrically invaginating at least some length of the evacuated piece to provide a symmetrically implanted portion of casing by moving the hollow rod under vacuum into the bore of the stick for the length;

(g) placing a fixed surface adjacent the closable end of the stick;

(h) removing the vacuum provided by the vacuum means;

(i) axially compressing the invaginated portion of casing against the fixed surface to provide a symmetrical, implanted and axially compressed end closure for the stick.

The term "symmetrical", as used herein, refers to the characteristic of the invaginated unshirred length of casing and the implanted plug whereby the invaginated implanted casing material is uniformly distributed around the axis of the shirred stick. In contrast, prior art invaginated end closures, such as that disclosed in U.S. Pat. No. 3,383,222 and U.S. Pat. No. 3,892,869, are asymetrical, inasmuch as the casing material making up the end closure is not uniformly distributed around the axis of the shirred stick but rather is concentrated on one side of the plug.

The term "invaginate", as used herein, refers to the act of turning a casing outside surface inwardly into an inside surface by inturning a portion of unshirred casing into the stick bore. In contrast, prior art symmetrical end closures, such as those in U.S. Pat. Nos. 3,865,954, 3,914,447 and 4,070,729, are not invaginated since such end closures are formed by twisting the casing to form a plug, which is inserted into the stick bore.

In an alternate, preferred embodiment, an unvented, symmetrical, implanted and axially compressed end closure is provided by the above method with the additional step of removing the rod from the shirred stick after step (h) above.

In still another preferred embodiment, the shirred stick is mounted on a support tube and the second seal is between the support tube and the hollow rod.

In yet another aspect, the present invention encompasses an apparatus for forming a symmetrical end closure in a shirred casing stick having an internal bore and an unshirred length of casing comprising, in combination;

(a) a hollow rod supported in line with the bore of the shirred casing, the rod having at least one hole, the hole forming a passageway from an inside surface to an outside surface of the hollow rod;

(b) vacuum means in communication with the hollow rod to impose a vacuum through the hole;

(c) control means for inserting the hollow rod into the unshirred length of casing from an end of the shirred casing and, after evacuation of the unshirred length with said vacuum, for retracting and removing the hollow rod from the casing to invaginate the unshirred length into the stick bore, the vacuum means being cooperable with the control means to apply or release the vacuum at designated positions of the hollow rod; and (d) means for sealing an open end of the unshirred length of casing and an open end of the shirred casing stick to permit evacuation of the unshirred length by the vacuum prior to invaginating the unshirred length;

(e) ram means and stop means for compressing the unshirred length of casing into a symmetrical implanted end closure after invaginating the unshirred length within the bore using the hollow rod.

In a further embodiment of the apparatus of the invention, the hollow rod has a slideably mounted sealing means on the rod to seal an open end of the shirred casing stick.

Referring to the drawings, FIGS. 1 to 6 illustrate one method of forming a closure useful in the present invention. It should be appreciated that the apparatus as used in performing the methods for making the closure are illustrated schematically in the Figures.

FIG. 1 shows shirred casing stick 13 mounted on a tubular core or support tube 15 together with hollow rod 23 with sealing means 11 being inserted from the aft end of support tube 15. Support tube 15 can act as a stuffing horn during a subsequent stuffing operation. Support tube 15 terminates in a flange 17. Stretched over and beyond flange 17 is unshirred casing length 19.

The support tube as shown in FIG. 1 is optional, and it should be appreciated that the end closure can be formed as described herein without the requirement of a support tube.

Shirred casing stick 13 can be a "cored high density" stick as described in copending U.S. application Ser. No. 363,851, incorporated herein by reference. A cored high density casing article comprises a support tube with a shirred casing length mounted thereon and highly compacted on said core to a high pack ratio of at least about 100 and a packing efficiency of at least about 0.50. Such an article provides a casing stick having improved structural stability and strength, and it supplies additional stuffing length for a given shirred casing length, as compared to conventional shirred sticks.

Figure 2:
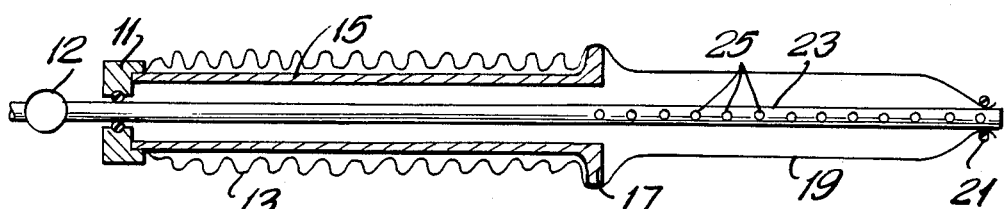

FIG. 2 shows the hollow tube 23 inserted from the "aft" end of the shirred casing stick 13, through the "fore" end of shirred casing 13, and into unshirred casing length 19. Hollow tube 23 has a plurality of holes, including hole 25, which cooperate with hollow tube 23 and vacuum source 12, in communication with hollow tube 23, to evacuate unshirred casing length 19 after placing a part of said casing length 19 in sealing contact with a part of hollow tube 23 using a closing means 21, such as "O" rings, an elastic band, an adhesive, a mechanical clamp, pins on the hollow tube, or the like. Alternatively, sealing means 21 can be provided by the operator of the apparatus, by manually pinching the end of the unshirred casing portion 19 with his fingers. Additionally, sealing means 21 can be provided either on the rod, as shown in FIG. 2, or off the end of the rod. The hollow tube 23 has an open "fore" end sealing means 21 and an "aft" end sealing means 11 so that evacuation of casing 19 can be accomplished.

Figure 3:
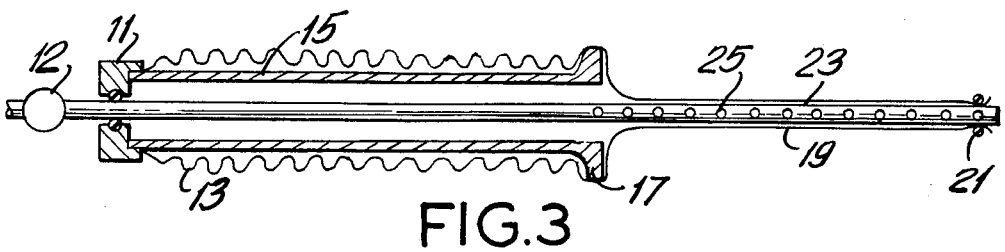

Referring now to FIG. 3, unshirred casing length 19 is shown fully evacuated and in contact with hollow tube 23 by virtue of the suction created by vacuum means 12 coacting with hollow tube 23, and sealing means 11 and 21.

Figure 4:
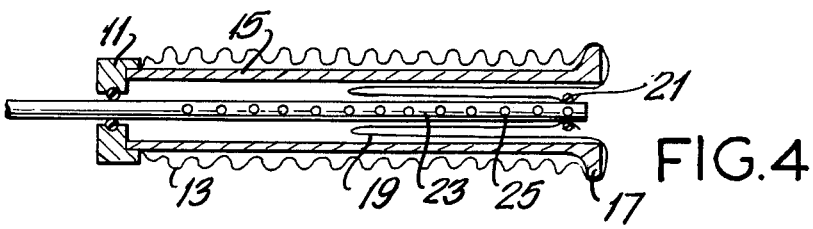

FIG. 4 shows hollow tube 23 having been drawn back through the fore end of shirred casing 13 and having invaginated unshirred casing length 19 within support tube 15.

Figure 5:
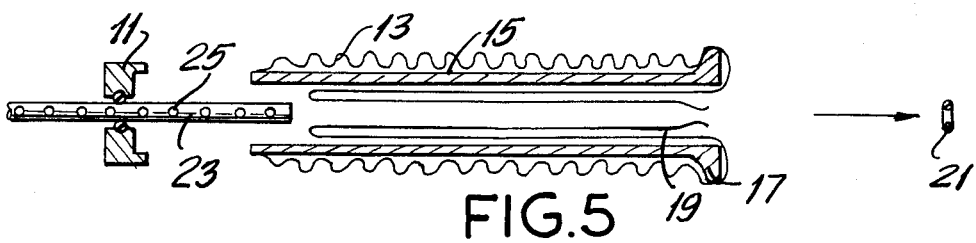

After release of the vacuum from hollow tube 23, hollow tube 23 and sealing means 11 are withdrawn from unshirred casing length 19 and sealing means 21 is removed from casing length 19, all as shown in FIG. 5.

Figure 6:
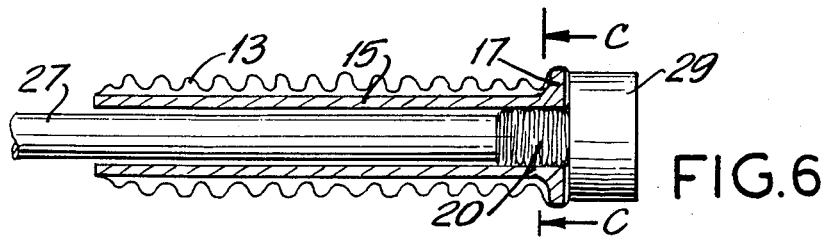

As shown in FIG. 6, ram 27 is inserted into support tube 15. Ram 27 coacts with stop 29 to compress the invaginated unshirred casing length 19 (FIG. 5) to provide a symmetrically implanted and axially compressed end closure 20 for shirred casing 13. The end closure 20 is shown in cross-section, in FIG. 7, where the cross-section is taken along lines c—c of FIG. 6.

Figure 8:
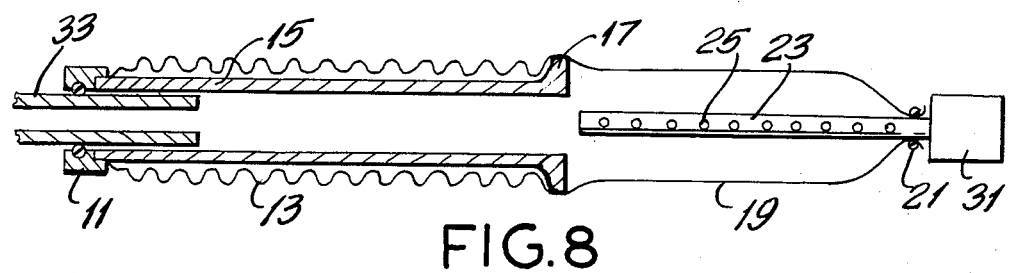
FIGS. 8 to 10 show, schematically and step-by-step, an alternate method of forming a casing stick article with closure in accordance with the present invention.
Figure 9:
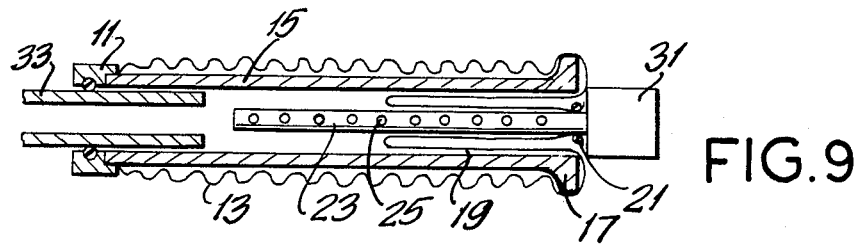

FIG. 8 shows an alternate embodiment of the present invention wherein hollow tube 23 with attached stop 31 is inserted into unshirred casing length 19 toward the fore end of shirred casing 13. A part of unshirred casing length is placed in sealed contact with a part of hollow tube 23 by closing and sealing means 21. Unshirred casing length 19 and support tube 15 are then evacuated by means of holes 25 in hollow tube 23 coacting with a vacuum source (not shown). Unshirred casing length 19 is then symmetrically invaginated inside support tube 15 by moving hollow tube 23 toward the aft end of shirred casing 13, releasing closing means 21 when stop 31 is in contact with unshirred casing at flange 17, as shown in FIG. 9.

Figure 10:
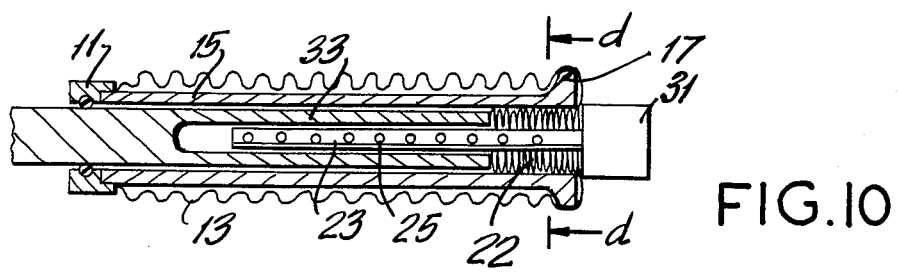

As shown in FIG. 10, closed ram 33 is inserted through support tube 15 at the aft end of shirred casing 13 to provide an implanted, axially compressed end closure 22 for the shirred casing 13 made from the invaginated unshirred casing length 19. The end closure 22 is shown in cross-section in FIG. 11, where the cross-section is taken along lines d—d of FIG. 10.

Figure 7:
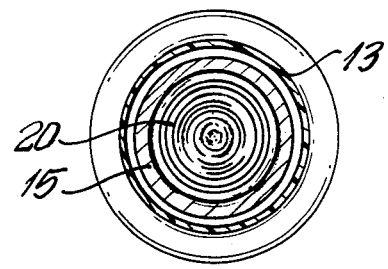
FIG. 7 shows a cross sectional view of the article of FIG. 5 taken along lines c—c.
Figure 11:
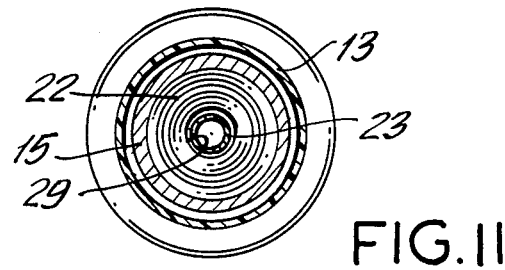
FIG. 11 shows a cross-sectional view of the article of FIG. 10 taken along lines d—d.

In contrast to the sealed end closure 20 of FIG. 7, the end closure 22 shown in FIG. 11 has vent hole 29 in the casing area that hollow tube 23 displaces during compression of unshirred casing length 19. This vent hole 29 provides easy venting of gases when a meat emulsion is pumped into the shirred casing article at the start of stuffing operations.

Figure 12:
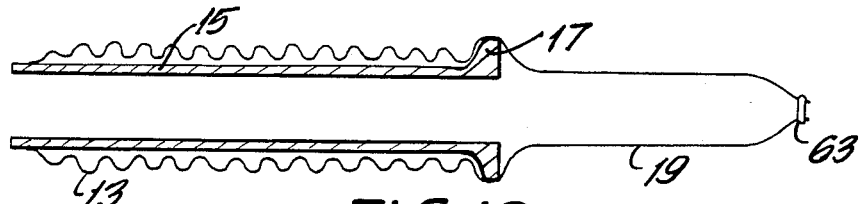
FIGS. 12 to 14 show, schematically and step-by-step, another alternate method of forming a casing stick article with closure in accordance with the present invention.
Figure 13:
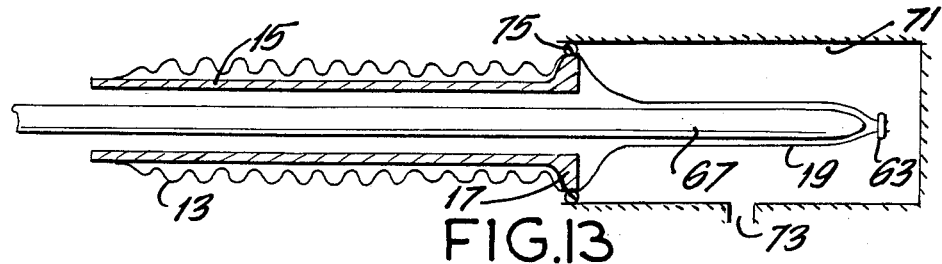
Figure 14:
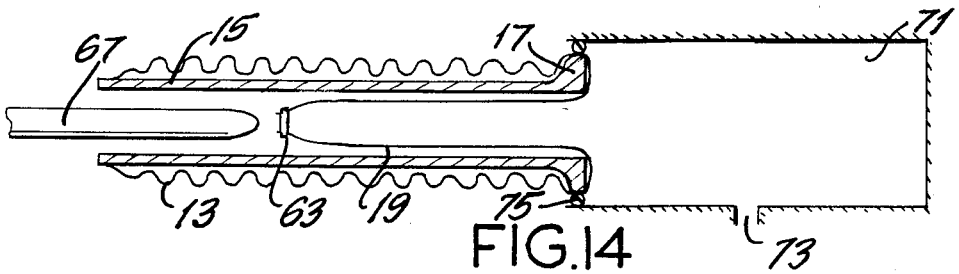

As shown in FIGS. 12 to 14, compression can be used instead of a vacuum to produce the desired invagination of the unshirred portion of casing. FIG. 12 shows shirred casing stick 13 mounted on support tube 15 with unshirred portion 19 having an end seal 63.

As shown in FIG. 13, solid rod 67 is inserted from the aft end of the shirred stick 13 into the unshirred portion of casing 19. Unshirred portion of casing 19 is enveloped by compression chamber 71 having compressed air inlet 73. Compression chamber 71 is sealed at flange 17 of support tube 15 by sealing means, such as "O" rings 75. Compressed air is fed into compression chamber 71 via inlet 73 to compress unshirred casing length 19 onto solid rod 67 as shown in FIG. 13.

As shown in FIG. 14, after pressure buildup, the compressed air in compression chamber 71 and upon withdrawal of solid rod 67, the unshirred portion of casing is invaginated into core 17 of shirred stick 13. In an alternate embodiment of the present invention, invagination can be effected by means of the compressed air or vacuum without the requirement of using solid rod 67.

Figure 15:
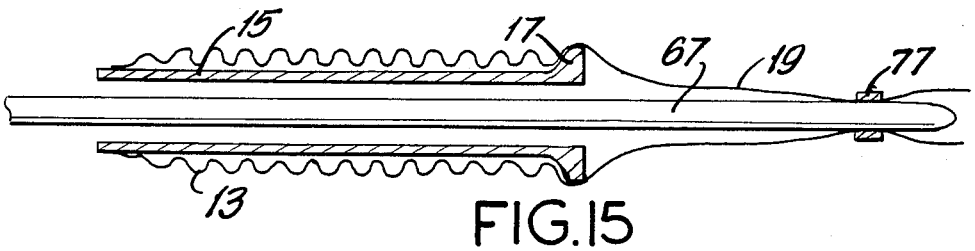
Figure 16:
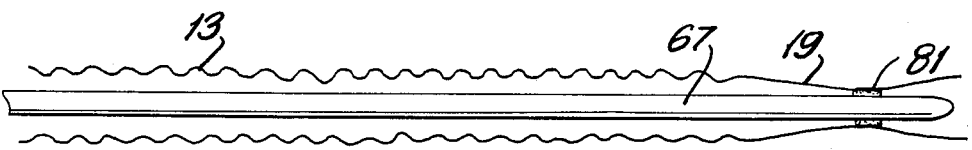
Figure 17:
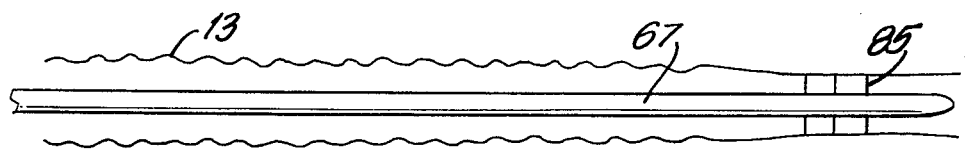

FIGS. 15 through 17 show alternate means of providing engagement of an unshirred portion of casing 19 to rod 67. FIG. 15 shows the use of mechanical clamp 77 to afix the unshirred casing 19 to rod 67. FIG. 16 shows the use of dabs of glue 81 to releasably adhere unshirred casing 19 to rod 67.

FIG. 17 shows the use of needles 85 mounted on rod 67 to afix unshirred casing length 19 to rod 67.

The full scope of the present invention is not intended to be limited by the above methods of producing the end closure of the invention. Suitable variations of the above methods are deemed to be within the skill of those in the art.

EXAMPLE

A shirred casing stick article with an end closure of the present invention was made as follows using the procedure of FIGS. 1 to 6 above:

Into a deshirred casing ength of a size 25 (having an inflated diameter of about 0.81 inch and a wall thickness of about 0.001 inch) shirred casing stick was placed a hollow vacuum tube having the dimensions of ¼ inch diameter by 2 feet long. The vacuum tube has 24 holes of 1/16th inch diameter near one end thereof. The open end of the deshirred casing length proximate to said holes was closed to facilitate application of a vacuum to the deshirred casing length. A vacuum pump connected to the opposite end of the vacuum tube was turned on and the deshirred casing length was evacuated.

After evacuation, the deshirred casing length was invaginated into the shirred stick by pulling the vacuum tube into the stick. At that point, the vacuum was released and the vacuum tube was removed from the evacuated deshirred length of casing and the shirred stick bore. A ram was then inserted into the bore of the shirred stick from the stick end opposite the end where the vacuum tube had been inserted, and a stop was placed against the closed tube end of the stick. The ram was then pushed in the direction of the stop, thus forcing the invaginated deshirred casing length to be compressed to form an implanted end closure.

The shirred casing stick article having the newly formed end closure was then used to enclose sausage emulsion in a conventional fashion by mounting the shirred stick onto a frankfurter stuffing machine, and then filling the casing with sausage emulsion until the entire shirred stick had been used.

The first stuffed link was undersized, which is typical in such stuffing operation, and was stripped or "milked" of meat emulsion (i.e., the emulsion was squeezed out of the undersized link of casing to recover the emulsion for recycling) so that it was not used, but the subsequent links had acceptable quality for commercial use.

I claim:

1. A hollow shirred stick tubular casing article having compressed casing pleats disposed about and along a cylindrical bore, with an end portion of said casing length extended forward from said pleats and over a fore end of said bore and formed into an end closure inside said bore; said end closure being a compacted, substantially axially symmetrical body of casing composed of at least one single-ply tubular layer of the casing of said end portion invaginated symmetrically into said bore and collapsed axially upon itself inside said bore between an end of a said layer and the end of said casing end portion.

2. A shirred casing article according to claim 1, said compacted body being composed of casing of an outer said layer invaginated into said bore and extending through a tubular fold of casing into an inner said layer, the casing of said layer being collapsed axially upon itself inside said bore between said fold and the forward end of said inner layer.

3. A shirred casing article according to claim 1, said compacted body being composed of the casing of a single said layer invaginated into said bore and collapsed axially upon itself inside said bore between its end in said bore and said fore end of said bore.

4. A shirred casing article according to claim 1, 2, or 3, said bore being constituted by an elongated substantially rigid and uniformly cylindrical tube having said compressed casing pleats gripped onto its outer surface, and forming throughout its length a straight cylindrical passageway for conducting foodstuff into casing extended over its said fore end from said pleats; said compacted body being inside said tube.

* * * * *